United States Patent [19]

Jeswine

[11] Patent Number: 4,607,813
[45] Date of Patent: Aug. 26, 1986

[54] PARACHUTE ASSEMBLY

[75] Inventor: William W. Jeswine, Issaquah, Wash.

[73] Assignee: William W. Jeswine, Seattle, Wash.

[21] Appl. No.: 474,243

[22] Filed: Mar. 10, 1983

[51] Int. Cl.⁴ .................... B64D 17/08; B64D 17/16
[52] U.S. Cl. ................................ 244/145; 244/152
[58] Field of Search .............. 244/142, 144, 145, 147, 244/148, 149, 152, 126

[56] References Cited

U.S. PATENT DOCUMENTS

| | | | |
|---|---|---|---|
| 1,194,691 | 8/1916 | Adams | 244/152 |
| 1,273,553 | 7/1918 | Upson | 244/149 |
| 1,340,259 | 5/1920 | Taylor | 244/152 |
| 1,562,258 | 11/1925 | Russell | |
| 2,104,966 | 1/1938 | Baker | 244/145 |
| 2,134,362 | 10/1938 | Frieder | 244/145 |
| 2,258,797 | 10/1941 | Overbeke | 244/145 |
| 2,358,417 | 9/1944 | Quilter et al. | 244/142 |
| 2,458,264 | 1/1949 | Hart | 244/152 |
| 2,610,008 | 9/1952 | Smith | 244/152 |
| 2,634,068 | 4/1953 | Frieder et al. | 244/145 |
| 2,696,959 | 12/1954 | Aileo | 244/145 |
| 2,974,913 | 3/1961 | Steinthal | 244/145 |
| 3,099,426 | 7/1963 | Lemoigne | 244/145 |
| 3,136,508 | 6/1964 | Sepp, Jr. | 244/145 |
| 3,227,403 | 1/1966 | Ferguson | 244/145 |
| 3,228,636 | 1/1966 | Lemoigne | 244/145 |
| 3,240,451 | 3/1966 | Sepp, Jr. | 244/145 |
| 3,298,640 | 1/1967 | Heinrich | 244/145 |
| 3,385,539 | 5/1968 | Ewing et al. | 244/145 |
| 3,403,876 | 10/1968 | Mitchell | 244/145 |
| 3,434,680 | 3/1969 | Ferguson | 244/142 |
| 3,507,467 | 4/1970 | Sepp | 244/145 |
| 3,690,603 | 9/1972 | Lemoigne | 244/145 |
| 3,840,202 | 10/1974 | Lemoigne | 244/145 |
| 4,022,406 | 5/1977 | Matsuo | 244/152 |
| 4,098,475 | 7/1978 | Heinrich | 244/145 |
| 4,117,993 | 10/1978 | Palm et al. | 244/145 |
| 4,270,714 | 6/1981 | Jalbert | 244/145 |
| 4,355,774 | 10/1982 | Koenig | 244/145 |

FOREIGN PATENT DOCUMENTS

| | | | |
|---|---|---|---|
| 583027 | 8/1933 | Fed. Rep. of Germany | 244/152 |
| 402673 | 3/1943 | Italy | 244/152 |
| 1243721 | 8/1971 | United Kingdom | 244/152 |

OTHER PUBLICATIONS

Poynter, Daniel F., "The Parachute Manual," Sec. 8.1.11(5)—pp. 396 and 397.

Poynter, Daniel F., "The Parachute Manual," Sec. 8.1.16—p. 402.

Primary Examiner—Galen Barefoot
Attorney, Agent, or Firm—Seed and Berry

[57] ABSTRACT

A parachute assembly including a pilot chute, pilot chute suspension lines, a main chute, and a main chute suspension assembly. The main canopy has an inverted apex and has an inner section of panels and outer section of panels joined by a reinforced crown seam. The seams are secured with two parallel longitudinal stitchings with a relatively elastic thread and a zig-zag stitch with a relatively inelastic, stronger, heat-resistant thread. There are only half as many continuous panels in the inner section as compared to the outer section. Bands are connected to the lower lateral margin of the main canopy. The pilot chute is connected to the main chute by spaced, individual suspension lines which connect directly between the periphery of the pilot chute and the crown of the main canopy. The size of the pilot chute and the length of the suspension lines are coordinated so that the pilot chute is held near the top of the main canopy when the main canopy is fully deployed. The pilot chute will encase the main canopy and the suspension assembly when they are in a packed configuration. The suspension assembly includes a relatively elastic centerline which will part on excess loading. It also includes a riser which has a relatively elastic upper section and a strong abrasion resistant lower section.

9 Claims, 8 Drawing Figures

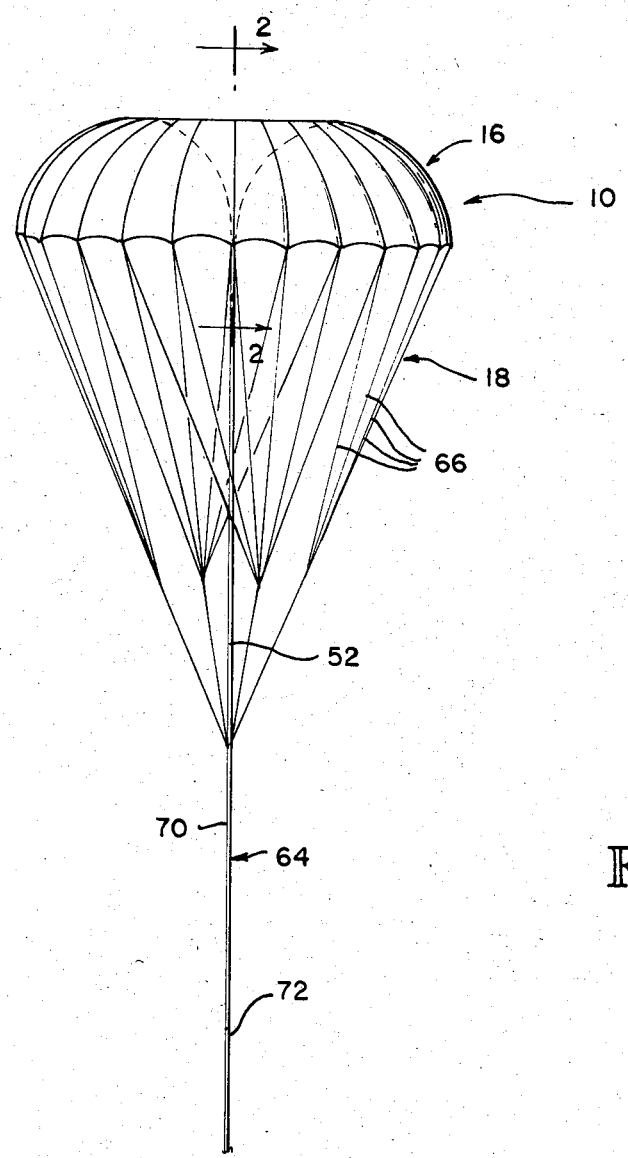
FIG. 1
FIG. 2
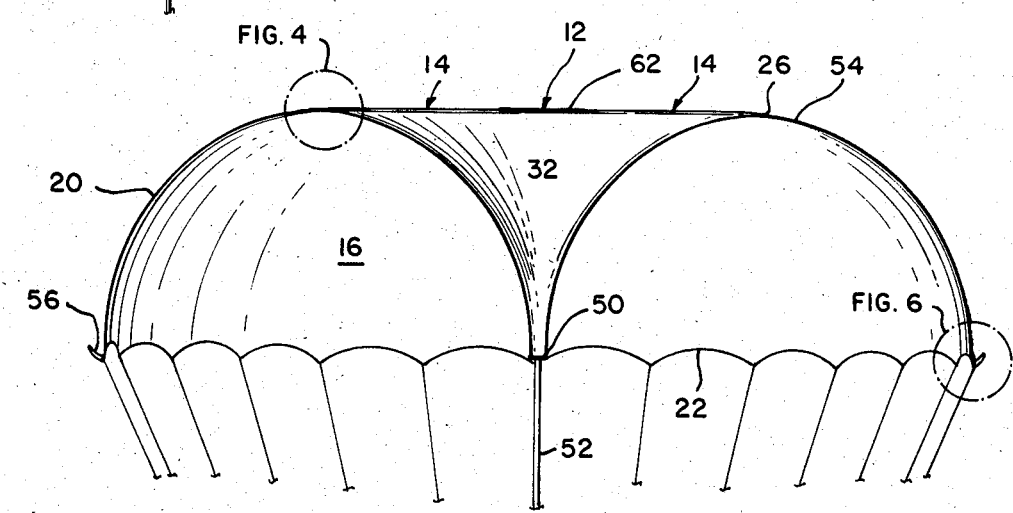

U.S. Patent  Aug. 26, 1986  Sheet 2 of 3  4,607,813
FIG. 3
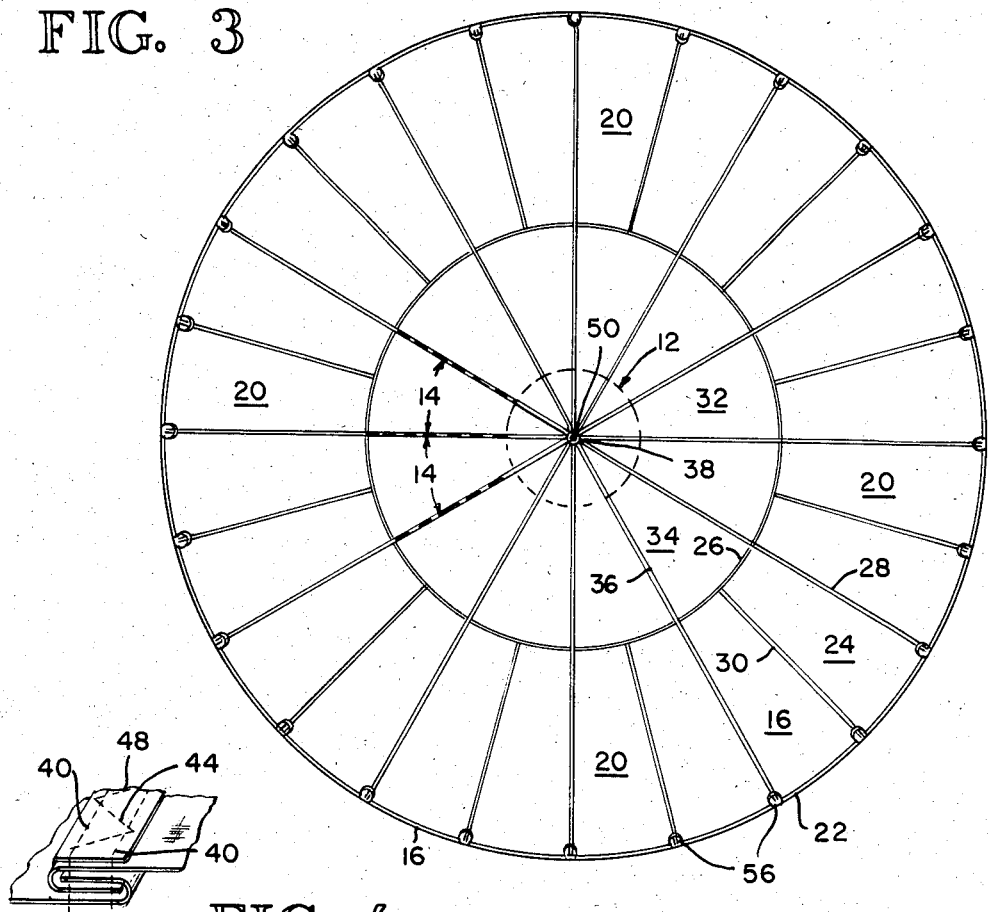
FIG. 4
FIG. 5
FIG. 6
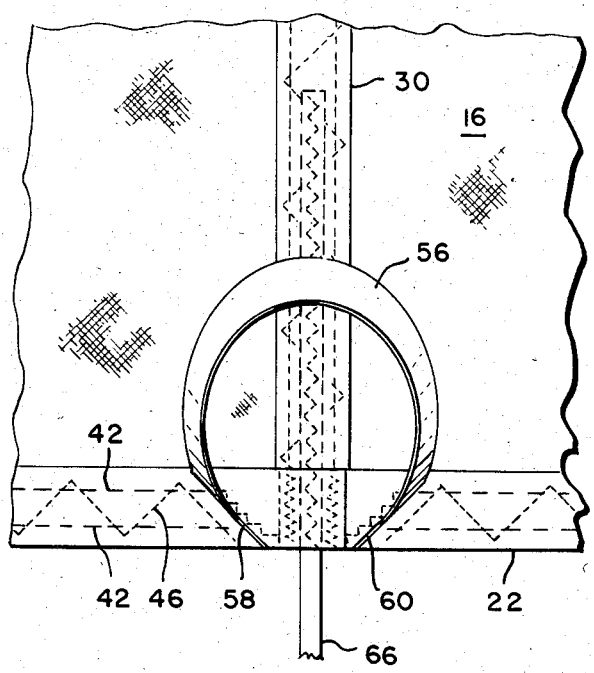

PARACHUTE ASSEMBLY

SUMMARY OF THE INVENTION

The invention involves a parachute assembly which includes a pilot chute, pilot chute suspension lines, a main chute, and a main chute suspension assembly which includes a centerline and a load supporting riser. The parachute is adapted for rapid deployment at low altitudes and has a high strength-to-weight ratio. It may be used in either manual or ballistic deployed systems in connection with ultralight aircraft and hang gliders; as well as, in other applications. The main canopy has an inverted apex and is formed of an inner section of panels and outer section of panels joined by a reinforced crown seam. The seams are preferably secured with two parallel longitudinal stitchings with a relatively elastic thread. Seams are also sewn in a zig-zag stitch with a relatively inelastic, stronger, heat-resistant thread. To reduce the number of reams at the crown, there are only half as many continuous panels in the inner section of the canopy as compared to the outer section of the canopy. Specially attached bands are connected to the lower lateral margin of the main canopy to create higher opening forces during deployment. The pilot chute is connected to the main chute by spaced, individual suspension lines which connect directly between the periphery of the pilot chute and the crown of the main canopy. The size of the pilot chute and the length of the suspension lines are coordinated so that the pilot chute is held near the top of the main canopy when the main canopy is fully deployed. The pilot chute will encase the main canopy and the suspension assembly when they are in a packed configuration. The suspension assembly includes a relatively elastic centerline which will part on excess loading. It also includes a riser which has a relatively elastic upper section and a strong abrasion resistant lower section.

DESCRIPTION OF THE DRAWINGS

FIG. 1 is a side elevation view of the parachute assembly.

FIG. 2 is a enlarged section view taken along the line 2—2 in FIG. 1.

FIG. 3 is a top plan view of the deployed main chute with the pilot chute and three suspension lines of the pilot chute shown in phantom.

FIG. 4 is an enlarged, partial section view in perspective of the crown seam taken from the position indicated in FIG. 2.

FIG. 5 is an enlarged, partial, side elevation view of a section of the main canopy along the outer lateral margin illustrating construction of a band, the attachment of a suspension line, and fastening details.

FIG. 6 is an exploded and enlarged, partial section view of the outer lateral margin of the canopy along a radial seam taken from the area designated in FIG. 2.

DETAILED DESCRIPTION OF THE INVENTION

Figure 7:
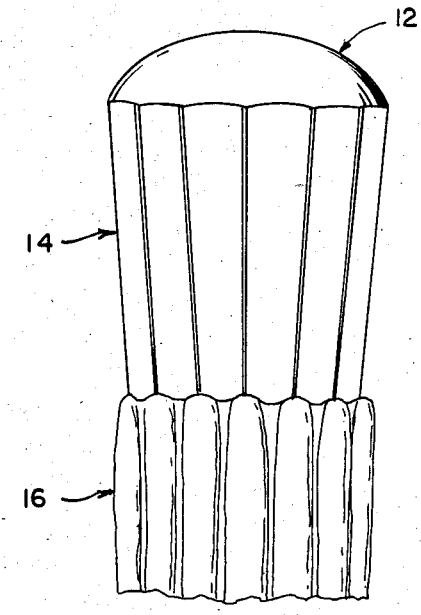
FIG. 7 is an enlarged, partial side elevation view of the deployed pilot chute and the top portion of the main canopy in a partially deployed state during the parachute assembly opening sequence.

The invention relates to a parachute assembly 10 as shown and described in the accompanying drawings. The parachute assembly includes a pilot chute 12, pilot chute suspension lines 14, a main parachute canopy 16, and a main canopy suspension assembly 18.

The parachute assembly, as shown in its preferred embodiment in the drawings and described below, is particularly adapted for use in connection with ultralight aircraft, hang gliders, and similar craft. Parachutes used in connection with such craft must have a high strength-to-weight ratio as compared with chutes in other applications because of the load limitations on such craft. Such chutes must also be capable of rapid deployment, such as by the use of manual or ballistic methods, since such craft very often spend most of their flying time at low altitudes. The parachute assembly shown and described is designed to have these characteristics.

The main canopy includes specific construction techniques and features which give it its light weight, high strength, and rapid opening characteristics. The canopy, preferably includeds an outer section which has an outer lateral margin 22 which forms a down turned edge. The outer section 20 consists of a series of panels of which panel 24 is representative. Each panel is bounded on its outer edge by the outer lateral margin or seam 22, on its inner edge by a reinforced crown seam 26, and on its lateral edges by radial seams 28 and 30. Preferably the inner and outer periphery of the outer section 20 is in a generally circular configuration, as shown in FIG. 3, when viewed from above. The balance of the canopy is formed by an inner section 32. The inner section is formed of a series of adjacent panels of which panel 34 is representative. Each panel is bounded by radial seams 28 and 36 on its lateral edges, the crown seam 26 on its outer edge and by an inner lateral margin or seam 38.

The construction of the canopy provides a high strength-to-weight ratio. The canopy panels are preferably formed of a rip-stop nylon. Preferably a ¾ ounce material with a 2 to 8 c.f.m. permeability. The fabric panels are preferably bias cut rather than block cut. The seams are preferably ⅜ inch seams rather than the more conventional ½ inch seams in order to reduce bulk. The radial seams are preferably sewn in a french fell seam. The crown seam is preferably constructed as illustrated in FIG. 4. The outer lateral seam is preferably constructed as illustrated in FIG. 6 with the panel margin secured around a reinforcing tape. The inner lateral seam is similarly constructed. Each seam is preferably doubly sewn with two types of thread. The seam is secured longitudinally as shown in seams 40 and 42 with a relatively elastic thread such as nylon. Preferably there are two parallel, spaced longitudinal stitchings. The seams are also secured with a zig-zag stitch as shown in stitching 44 and 46 with a relatively inelastic and stronger thread. The thread used is preferably a heat-resistant aramid fiber such as the aramatic polyamide fiber may by DuPont and sold under the brand name, Kevlar. Initial loading on the seam is withstood principally by the longitudinal stitching. As the loading increased longitudinal seams stretch to a point where the loading is shared with the Kevlar zig-zag stitching. One of the principal causes of catastrophic failure in canopies is line burns. Line burns are caused by chute suspension lines rubbing against the nylon fabric during the deployment sequence and melting the panel fibers. Because the Kevlar thread is heat-resistant, such failures will be resisted at the seams. Because of the strength of the Kevlar it is possible to eliminate the use of reinforcing tape along the seams, but still obtain the desired strength in the seam. However, reinforcing tape 48 is preferably used at least on the crown seam as shown in FIG. 4. The double stitching construction gives the seams the combined benefits of the elasticity of the nylon thread and the strength and heat-resistance of the Kevlar thread.

The main canopy has an inverted apex 50 held down by centerline 52 which is described below. The inverted apex spreads out of the high pressure area in the deployed chute, increases the canopy area by approximately 18%, and reduces fill time. This results in increased loading occurring at the crown 54.

In order to reduce the number of seams at the crown the inner section 32 of the canopy has only half as many of the continuous panels as the outer section of the canopy 20. Thus while radial seams 28 and 36 extend from the outer periphery of the canopy to the inner periphery, radial seam 30 terminates at the crown seam 26. In other words a single gore of the main canopy is formed on its outer section by a single panel, such as panel 24, and ½ of an inner section panel, such as panel 34; adjacent pairs of gores in the inner section having their inner panels formed by one continuous panel. Such construction has a dramatic effect on the canopy by significantly increasing its strength while reducing its weight by the elimination of seams.

In order to reduce the opening time for the main chute bands 56 are attached to the outer lateral margin of the main canopy as shown in FIGS. 5 and 6. The bands reduce the fill time by creating eddies and outwardly directed forces which open the mouth of the chute faster to accept more air without reducing the circumference of the chute. They consist of loops of flexible material which are secured along upwardly divergent lines such as the zig-zag seams 58 and 60 illustrated in FIG. 5. The method of fastening and the form of the loop causes the loop to form an upward angular projection. Although the bands are shown at the intersection of each radial seam with the outer lateral band, they can be placed at fewer locations.

Figure 8:
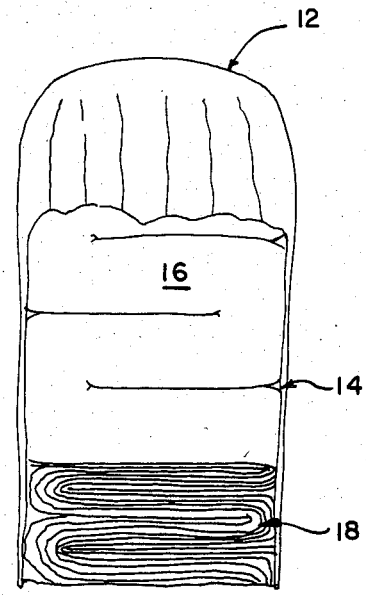
FIG. 8 is a side elevation view of the packed configuration of the parachute assembly with portions of the encasing pilot chute broken away.

The parachute assembly includes a pilot chute 12 and suspension lines 14. The pilot chute preferably has an outer periphery 62 which is preferably circular when viewed from above. In contrast to conventional pilot chute to main canopy connections, the suspension lines 14 for the pilot chute alone form the connection and consist of spaced, individual lines which connect directly between the periphery of the pilot chute and the main chute canopy. Preferably the suspension lines 14 are connected to the main canopy along the crown of the main canopy at the crown seam 26. This encourages rapid opening and filling of the main canopy upon deployment. See FIG. 7. The diameter of the pilot chute the length of the suspension lines 14, and the spacing of the connection points of the suspension lines to the main canopy when the main canopy is fully deployed is coordinated such that when the main canopy is fully deployed the suspension lines and pilot chute are held near the top of the canopy rather than trailing above the descending canopy. See FIGS. 2 and 3. Preferably the suspension lines of the canopy are all held within a substantially horizontal plane. The pilot chute canopy will encase the main canopy and suspension assembly when they are compactly packed as illustrated in FIG. 8. Such encasement is facilitated by the independent suspension line structure. This encasement is particularly advantageous when the parachute assembly is deployed by a ballistics system or similar system. The encasing pilot chute canopy promotes proper deployment since the package is shielded from turbulence caused by the relative wind coming from the launch direction.

The suspension assembly for the main canopy includes the centerline 52 which connects to the inverted apex, the riser 64 which connects the load, as well as the upper suspension lines 66 and the lower suspension lines 68 which connect the main canopy skirt to the riser 64. In the preferred embodiment the upper suspension lines 66 would consist of 24, four hundred pound test, nylon lines connected to the canopy as shown in FIG. 5. The upper suspension lines are connected in four groups to the lower suspension lines consisting of 4, twenty-five hundred pound test, Kevlar straps. The riser consists of 2 segments 70 and 72. The upper section 70 consists of a more flexibly shock absorbing section. It may be constructed of, for example, a section of four thousand pound test nylon or a section of ¼ inch tubular strap of nylon material inside a one inch tubular strap of nylon material for an approximate five thousand pound load capability. Alternatively, the interior strap may be of the Kevlar material. The ends of the Kevlar and nylon combination are fastened together so that the Kevlar strap is slack and the initial shock loading on deployment is absorbed by the nylon. After initial loading, the nylon will stretch to a point where the Kevlar will then share the load. The result is a shock absorber type of effect. The lower section 72 consists of a relatively inflexible section, such as, ten thousand pound test Kevlar strap. This lower section of the riser is made of a Kevlar material primarily because of its strength and resistance to physical damage. In connection with its use with ultralight aircraft, the lower section may be deployed in such a manner that the riser will extend through the path of the craft's turning propeller. The strength and weight of the lower section of the riser is selected to resist damage from the propeller or other portions of the aircraft structure and ideally to stop the propeller, killing the engine during an emergency descent by parachute. The high temperature characteristics of the Kevlar material also avoids damage to the riser which could otherwise be caused by a hot exhaust manifold or engine. In a typical example, the lower section of the riser may be approximately 6 feet long and the upper section of the riser may be 14 feet long.

The centerline is preferably constructed of a relatively flexible material such as a twenty five-hundred pound test nylon material. Its loading ability is coordinated with the capacity of the chute so that in severe opening shocks the centerline would sever and absorb excess shock energy before the canopy would fail.

The total parachute assembly when constructed as described above has a relatively high strength-to-weight ratio. It also opens rapidly and is able to withstand the common conditions found in use in connection with ultralight aircraft and similar low altitude craft. For example, with a main canopy having a 29 foot diameter the parachute assembly would weigh between 8 and 10 pounds and would be suitable for use with a 500 pound load.

While the parachute assembly described above is particularly adapted for use in connection with ultralight aircraft and/or hang gliders, the use of the components of the assembly individually or collectively in other applications is possible.

I claim:

1. A parachute assembly, comprising;
   (a) a pilot chute canopy having an outer periphery;
   (b) a main parachute canopy having an outer section with downturned edges in a deployed configuration; and
   (c) a plurality of spaced, independent, pilot chute suspension lines depending from the outer periphery of the pilot parachute canopy and each connected directly to the main chute canopy at spaced intervals intermediate to the lateral margin and its central apex to encourage rapid opening of the main canopy on deployment, wherein the length of the pilot chute suspension lines and the size of the pilot chute are coordinated with the points of connection of the suspension lines to the main canopy so that the pilot chute and the pilot chute suspension lines are held near the top of the main canopy when the main canopy is fully deployed so that the pilot chute suspension lines do not trail behind the descending deployed main canopy.

2. A parachute assembly, as claimed in claim 1, wherein the pilot canopy has a generally circular outer periphery and the pilot chute suspension lines are connected to the main canopy at spaced intervals defining a generally circular pattern when the main canopy is deployed.

3. A parachute assembly, as claimed in claim 2, wherein the length of the suspension lines is coordinated with the diameter of the pilot chute and the pilot chute suspension line spacing so that the pilot canopy and suspension lines lie substantially within a single plane when the main canopy is fully deployed.

4. A parachute assembly, as claimed in claim 3, wherein the main canopy has an inverted apex and the pilot chute suspension lines are connected to the crown of the main canopy.

5. A parachute assembly, comprising;
   (a) a pilot chute canopy having an outer periphery;
   (b) a main parachute canopy having an outer section with downturned edges in a deployed configuration; and
   (c) a plurality of spaced, independent, pilot chute suspension lines depending from the outer periphery of the pilot chute canopy and each connected, directly to the main chute canopy at spaced intervals intermediate to the lateral margin and its central apex to encourage rapid opening of the main canopy upon deployment; and
   (d) a plurality of flexible bands secured near the periphery of the main chute, on the outside of the main chute, each in the form of loops which project outward to speed the opening of the main chute.

6. A parachute assembly, as claimed in claim 3, wherein the bands comprise strips of a flexible material formed into loops and secured to the main canopy along two upwardly divergent lines to promote an upward, angular projection of the band during deployment of the main chute.

7. A parachute assembly comprising:
   (a) a canopy having an outer periphery; and
   (b) a plurality of collapsible bands of flexible material secured to the outside periphery of the canopy in the form of loops which project outward to speed the opening of the chute and which are fastened to the main canopy along one side and are of a sufficient length so as not to reduce the circumference of the canopy.

8. A parachute assembly, as claimed in claim 7, wherein the bands comprise strips of a flexible material formed into loops and secured to the canopy along two upwardly divergent lines to promote an upward, angular projection of the band during deployment of the canopy to increase the opening speed of the canopy.

9. A parachute assembly comprising:
   (a) a canopy having an outer periphery; and
   (b) a plurality of bands secured near the periphery of the canopy in the form of loops which project outward to speed the opening of the canopy and comprising strips of flexible material formed into loops and secured to the canopy along two upwardly divergent lines to promote an upward, angular projection of the band during deployment of the canopy to increase the opening speed of the canopy.

* * * * *